US012573508B2

(12) United States Patent
Limbäck et al.

(10) Patent No.: US 12,573,508 B2
(45) Date of Patent: Mar. 10, 2026

(54) CLADDING TUBE FOR A FUEL ROD FOR A NUCLEAR REACTOR, A FUEL ROD, AND A FUEL ASSEMBLY

(71) Applicant: Westinghouse Electric Sweden AB, Västerås (SE)

(72) Inventors: Magnus Limbäck, Västerås (SE); Jonathan Wright, Västerås (SE); Mats Dahlbäck, Västerås (SE); Antoine Claisse, Västerås (SE)

(73) Assignee: Westinghouse Electric Sweden AB, Västerås (SE)

( * ) Notice: Subject to any disclaimer, the term of this patent is extended or adjusted under 35 U.S.C. 154(b) by 518 days.

(21) Appl. No.: 17/923,409

(22) PCT Filed: Mar. 11, 2021

(86) PCT No.: PCT/EP2021/056190
§ 371 (c)(1),
(2) Date: Nov. 7, 2022

(87) PCT Pub. No.: WO2021/223925
PCT Pub. Date: Nov. 11, 2021

(65) Prior Publication Data
US 2023/0197296 A1 Jun. 22, 2023

(30) Foreign Application Priority Data
May 7, 2020 (EP) .................................... 20173433

(51) Int. Cl.
*G21C 3/07* (2006.01)
*C22C 16/00* (2006.01)

(52) U.S. Cl.
CPC ................ *G21C 3/07* (2013.01); *C22C 16/00* (2013.01)

(58) Field of Classification Search
CPC .............. G21C 3/07; G21C 3/20; C22C 16/00
See application file for complete search history.

(56) References Cited

U.S. PATENT DOCUMENTS 2,736,651 A * 2/1956 Schwope ................ C22C 16/00 313/62
2,746,861 A * 5/1956 Chubb, Jr. .............. C22C 16/00 420/422

(Continued)

FOREIGN PATENT DOCUMENTS

EP 3477660 A1 5/2019
EP 3502321 A1 6/2019

(Continued)

OTHER PUBLICATIONS

International Search Report issued in corresponding PCT Application No. PCT/EP2021/056190, dated mailed Apr. 30, 2021, pp. 1-2.
K Rejčí, Jakub et al., Chromium and Chromium Nitride Coated Cladding for Nuclear Reactor Fuel, 2017, pp.
Notice of Reasons for Rejection issued in corresponding JP Application No. 2022-564683, dated Oct. 1, 2024, pp. 1-3.

(Continued)

*Primary Examiner* — Sharon M Davis
(74) *Attorney, Agent, or Firm* — K&L Gates LLP

(57) ABSTRACT

A cladding tube, a fuel rod and a fuel assembly are disclosed. The cladding tube comprises a tubular base component having an outer surface and an inner surface defining an inner space of the cladding tube housing a pile of fuel pellets. The tubular base component is made of a Zr-based alloy. A coating is applied onto the outer surface for protecting the tubular base component from mechanical wear, oxidation and hydriding. The Zr-based alloy has the following composition: Zr=balance, Al=0-2 wt %, Ti=0-20 wt %, Sn=0-6 wt %, Fe=0-0.4 wt %, Nb=0-0.4 wt %, O=200-1800 wtppm, C=0-200 wtppm, Si=0-200 wtppm, and S=0-200 wtppm. The total amount of Al+Ti+Sn>2.5 wt % and ≤28 wt %.

15 Claims, 1 Drawing Sheet

(56) References Cited

U.S. PATENT DOCUMENTS

| | | | | |
|---|---|---|---|---|
| 2,813,073 | A * | 11/1957 | Saller | G21C 3/07 976/DIG. 57 |
| 4,879,093 | A * | 11/1989 | Garde | G21C 3/07 420/422 |
| 5,073,336 | A * | 12/1991 | Taylor | C22C 16/00 376/416 |
| 2010/0108204 | A1* | 5/2010 | Park | G21C 21/02 148/557 |
| 2013/0251087 | A1 | 9/2013 | Short | |
| 2013/0302639 | A1 | 11/2013 | Song et al. | |
| 2015/0050521 | A1 | 2/2015 | Le Flem et al. | |
| 2015/0348652 | A1 | 12/2015 | Mazzoccoli et al. | |
| 2018/0294062 | A1* | 10/2018 | Wolfe | G21C 3/07 |

FOREIGN PATENT DOCUMENTS

| | | | | |
|---|---|---|---|---|
| GB | 1569078 | A * | 6/1980 | G21C 3/20 |
| JP | H0718007 | B2 | 1/1995 | |
| WO | 9518874 | A1 | 7/1995 | |
| WO | 20040077452 | A1 | 9/2004 | |
| WO | 2015073328 | A1 | 5/2015 | |
| WO | 2018067425 | A2 | 4/2018 | |

OTHER PUBLICATIONS

L. Leal et al., "Assessment of Titanium Cross Sections and Uncertainties for Application in Criticality Safety," Proceedings of the 8th International Conference on Nuclear Criticality Safety, ICNC 2007, vol. II, St. Petersburg, Russia, May 28-Jun. 1, 2007, pp. 50-52.

Xia et al., "Microstructure evolution, mechanical properties, and corrosion behavior of novel (50Zr—50Ti)—xNi ternary alloys", Materials Science and Engineering A, vol. 846, Jun. 27, 2022, 143308, pp. 1-9.

A. Abe et al., "Revisiting Stainless Steel as PWR Fuel Rod Cladding after Fukushima Daiichi Accident," Journal of Energy and Power Engineering 8, 2014, pp. 973-980.

https://www.ncnr.nist.gov/resources/n-lengths/elements/ti.html, Neutron News, vol. 3, No. 3, 1992, pp. 29-37.

https://www.ncnr.nist.gov/resources/n-lengths/elements/zr.html, Neutron News, vol. 3, No. 3, 1992, pp. 29-37.

Akito Oizumi, Hiroshi Akie, Nobuyuki Iwamoto, and Teruhiko Kugo, "Evaluation of neutron economical effect of new cladding materials in light water reactors," Journal of Nuclear Science and Technology, 2014, vol. 51, No. 1, pp. 77-90.

* cited by examiner

CLADDING TUBE FOR A FUEL ROD FOR A NUCLEAR REACTOR, A FUEL ROD, AND A FUEL ASSEMBLY

CROSS REFERENCE TO RELATED APPLICATIONS

The instant application is a U.S. National Stage application of and claims priority to PCT/EP2021/056190, filed on Mar. 11, 2021, which is a PCT application of and claims priority to EP Application No. 20173433.2 filed on May 7, 2020, the subject matter of both aforementioned applications are hereby incorporated by reference in their entireties.

TECHNICAL FIELD OF THE INVENTION

The present invention refers generally to a cladding tube for a fuel rod for a nuclear reactor, especially a Light Water Reactor, LWR, such as a Boiling Water Reactor, BWR, a Pressure Water Reactor, PWR, or a Water-Water Energetic Reactor, VVER. More precisely, the cladding tube comprises a tubular base component having an outer surface and an inner surface defining an inner space of the cladding tube housing a pile of fuel pellets, wherein the tubular base component is made of a Zr-based alloy, and a coating applied onto the outer surface of the tubular base component and configured to protect the tubular base component from mechanical wear, oxidation and hydriding.

The present invention also refers to a fuel rod, and to a fuel assembly.

BACKGROUND OF THE INVENTION

Efforts are made today to develop so called Accident Tolerant Fuel, ATF, for nuclear reactors. Cladding tubes of a tubular base component of Zr-based alloys provided with a coating are a near term solution to be considered. For such coated cladding tubes, not only the coating but also the tubular base component is important for the overall performance of the cladding tube and the fuel rod.

The approach today is to use a base alloy that is well known and widely utilized in today's fuel designs, e.g. ZIRLO, M5, LK3 (Zircaloy-2), HiFi (Modified Zlrcaloy-2). This brings two clear advantages:

i) the mechanical properties, e.g., creep strength, of the tubular base component are well known and today's models and codes can with rather limited updates be applied to coated claddings that utilize tubular base components of well-known Zr-based alloys, and ii) in case the coating has imperfections that enable the coolant water to penetrate the coating, the corrosion properties of the Zr-based alloy are well known and likely sufficiently good to mitigate severe local corrosion/hydriding.

The Zr-based alloys utilized in today's commercial fuel cladding products (e.g. ZIRLO, Optimized ZIRLO, M5, LK3 and HiFi) are developed to be an optimized compromise when regarding a multitude of materials performance areas, such as mechanical properties and corrosion (oxidation and hydriding) resistance.

The Zr-based alloys that are utilized in today's PWR fuel assembly components typically include Nb as one of the essential alloying elements. Nb decreases the $\alpha$ to $\beta$ phase transformation temperature, which can be an issue during potential transients and LOCA (Loss of Coolant Accident).

Sn is another alloying element that is commonly used in Zr-based alloys in both PWR and BWR fuel assembly components. The upper and lower limits for the Sn concentration in the traditional Zircaloy-2 and Zircaloy-4 alloys are specified to 1.2 and 1.7 wt %, respectively. In PWRs it is well known that the corrosion resistance is improved if the Sn concentration is decreased within the range specified for Zircaloy-2 and Zircaloy-4. When comparing the Russian E635 alloy and ZIRLO and Optimized ZIRLO, it is furthermore observed that the resistance against uniform corrosion in PWRs is improved as the Sn content decreases, within the range 0.65 to 1.3 wt %, also for ZrSnNbFe alloys.

Sn not only affects the corrosion properties, but also strongly affects the mechanical properties of a Zr-based alloy. Sn increases the mechanical strength and decreases the creep rate. Furthermore, Sn is an $\alpha$ stabilizer and, consequently, increases the $\alpha$ to $\beta$ phase transformation temperature, which is beneficial during potential temperature excursions. In the initial development of Zr-based alloys for nuclear application both binary ZrSn and ZrNb alloys were considered. Zircaloy-1 actually was a binary Zr-2.5Sn (Zr alloy with 2.5 wt % Sn) alloy. Binary ZrSn alloys have not been used widely in commercial applications, while binary ZrNb alloys (Zr-1Nb and Zr-2.5Nb) are still in use in for example PWRs and VVERs. The binary ZrNb alloys, however, have poor corrosion resistance in oxidizing conditions and are, consequently, not used in BWRs.

US 2015/0348652 discloses a cladding tube comprising a tubular base component of a Zr-based alloy comprising a majority amount of Zr and a minority amount of up to 2 wt % of other metals such as Nb, Sn, Fe, Cr and combinations thereof. The cladding tube also comprises a coating comprising a first layer comprising an elemental metal and a second layer comprising elemental Cr.

US 2015/050521 discloses a cladding tube comprising a tubular base component with a coating of one or more protective layers of Cr, a Cr alloy or a tertiary alloy of Nb—Cr—Ti. The tubular base component could be made of for instance Zircaloy-4.

WO 95/18874 relates to a zirconium alloy for nuclear fuel components such as cladding tubes, spacers, boxes, etc., with improved properties with respect to the absorption of hydrogen released during corrosion.

US 2013/251087 discloses surface modification of cladding material of a nuclear fuel element.

EP 3477660 discloses a cladding tube for a fuel rod to be used in a nuclear fission reactor. The cladding tube comprises a tubular base layer of a zirconium based alloy, and a coating layer.

*Chromium and Chromium Nitride Coated Cladding for Nuclear Reactor Fuel* by Krejci et al, 2017, concerns Accident Tolerant Fuels, in particular a cladding tube of a Zr-based alloy having a relatively high concentration of Nb, up to 1.7%. The Zr-based alloy has a coating of Cr or CrN.

*A Review of High Strength Zirconium Alloys* by C. D. Williams, 1969, discusses various Zr-based alloys comprising for instance Al, Ti and Sn. The alloys are being developed for high temperature applications at 450-500° C.

SUMMARY OF THE INVENTION

The inventors of the present invention have realized that if a perfect, or substantially perfect, coating, essentially without defects, is applied to the tubular base component, the optimization of the tubular base component could be done without considering the corrosion properties of the Zr-based alloy of the tubular base component. This would increase the freedom and drastically enhance the possibilities when optimizing the Zr-based alloy of the base component.

The purpose of the present invention is thus to provide a coated cladding tube having overall improved properties for being utilized in a nuclear reactor.

This purpose is achieved by the cladding tube initially defined, which is characterized in that the Zr-based alloy has the following composition:

Zr=balance,
Al=0-2 wt %,
Ti=0-20 wt %,
Sn=0-6 wt %,
Fe=0-0.4 wt %,
Nb=0-0.4 wt %,
=200-1800 wtppm,
C=0-200 wtppm, or traces-200 wtppm,
Si=0-200 wtppm, or traces-200 wtppm, and
S=0-200 wtppm, or traces-200 wtppm, wherein 2.5 wt %<Al+Ti+Sn≤28 wt %.

The tubular base component of the Zr-based alloy having such a composition with a relatively high concentration of the alloying elements Al, Ti and/or Sn may have excellent mechanical properties, for instance a high mechanical strength and a low creep rate, and a high α to β phase transformation temperature. The coating on the outer surface of the tubular base component may enclose the whole outer surface of the tubular base component, and may thus ensure the integrity of the tubular base component. The coating may provide sufficient and reliable protection against mechanical wear and corrosion, both oxidation and hydriding.

Consequently, when applying the coating to the outer surface of the tubular base component, Zr-based alloys with good mechanical properties, but relatively poor corrosion resistance, such as ZrSn alloys with a Sn content of up to 6 wt %, i.e. well above the upper limit specified for Zircaloy-2 and Zircaloy-4, could be used for the base component of the cladding tube. The increased yield strength, ultimate tensile strength and creep strength, resulting from the higher Sn concentration, could enable a decrease in cladding wall thickness, which in turn would allow an increased fuel pellet diameter. This change would, consequently, support an increase of the uranium weight of the fuel assemblies, which in turn could decrease the fuel cycle cost.

Essentially, the same improvements of the mechanical properties that are achieved by Sn in the Zr-based alloy may be expected also for Al and Ti as alloying elements, i.e. for ZrAl with an Al content of up to 2 wt %, or for ZrTi with a Ti content of up to 20 wt %.

Like Sn, both Ti and Al are α stabilizers, and may thus contribute to an increase of the α to β phase transformation temperature.

Sn, Al and Ti are all advantageous in that they have a relatively high solubility in the zirconium.

In the Zr-based alloy of the tubular base component of the cladding tube, Zr is utilized as the main component at least partly due to its low neutron absorption cross section, with an average of 0.186 b for natural Zr, i.e. for the naturally occurring isotopes. The neutron absorption cross section has to be considered also for the alloying elements, especially when the concentration of the alloying elements becomes relatively high. The neutron absorption cross section of natural Ti is 6.09 b. The neutron absorption cross section of natural Sn is 0.626 b. For Al only Al-27 and Al-26 occur naturally, however Al-27 comprises nearly all natural Al. Al-27 has a neutron absorption cross section of 0.231 b.

Sn, Al and Ti may be added separately or in combination, wherein the total amount of Sn+AI+Ti is larger than 2.5 wt %.

The increased Sn, Ti and/or Al content is, consequently, an advantageous optimization of the Zr-based alloy relying on a sufficient and reliable corrosion resistance of the coating.

Oxygen, which is to be considered as an alloying element and not an impurity, contributes to enhance the mechanical properties of Zr-based alloys. In particular, oxygen is added to increase the yield strength by solution strengthening. Oxygen is an α stabilizer, expanding the α region of the phase diagram by formation of an interstitial solid solution.

The Zr-based alloy may comprise relatively low additions of Fe in the range of 0-0.4 wt %, for instance 0.1-0.4 wt %, 0.2-0.4 wt %, or 0.3-0.4 wt %. Fe is considered as a β-eutectoid, because, in its phase diagram, Fe has an eutectoid decomposition of the β phase. Generally, Fe was originally added as an alloying element to Zr-based alloys to enhance the corrosion resistance. It has later been observed that Fe may decrease the irradiation induced growth of Zr-based alloys, and that is the reason why it may be included in the Zr-based alloy of the present invention.

The Zr-based alloy may comprise relatively low additions of Nb, up to its solubility limit around 0.4 wt %, and thus in the range 0-0.4 wt %, for instance 0.1-0.4 wt %, 0.2-0.4 wt %, or 0.3-0.4 wt %. Nb is a β stabilizer. From pure β-Zr to pure Nb there exists a complete substitutional solid solution at high temperature. A monotectoid transformation occurs at about 620° C. and around 18.5 at % Nb. The upper Nb concentration in the Zr-based alloy of the present invention is selected to maintain Nb in solid solution also in the α phase, whereby it can provide solution strengthening while having negligible impact on the phase transformation temperature. Nb may also increase the creep strength and decrease the irradiation induced growth.

According to an embodiment of the invention, said at least one layer comprises at least one of Cr, a ceramic oxide, a ceramic carbide, a ceramic nitride and Diamond-Like Carbon (DLC), together with possible other alloying elements. Such a layer may further improve the resistance to corrosion, both oxidation and hydriding. Cr may be advantageous as the sole element or the main element of the layer of the coating because of its high or very high resistance to corrosion, both oxidation and hydriding. Cr may be present in a compound or as elemental Cr.

According to an embodiment of the invention, said the at least one layer forms an outer surface layer configured to be in contact with a cooling and moderating medium of the nuclear reactor.

According to an embodiment of the invention, the coating has a thickness of at most 0.1 mm. In order to keep the absorption of thermal neutrons at an acceptable level to minimize the impact of the coating on the neutron economy of the fuel rod, it is important to keep the thickness of the coating low.

According to an embodiment of the invention, the coating has a thickness of at least 0.003 mm, at least 0.005 mm or at least 0.01 mm. This minimum thickness of the coating has been chosen to obtain a secure bonding to the substrate and excellent protective properties of the coating.

According to an embodiment of the invention, the coating is physically vapor deposited onto the outer surface of the tubular base component. By means of physical vapor deposition, PVD, a strong bond between the coating and the tubular base component is achieved.

According to an embodiment of the invention, the amount of Sn=1-6 wt %, 2-6 wt %, 3-6 wt %, 4-6 wt %, 5-6 wt %, 1-5 wt %, 1-4 wt %, 1-3 wt %, or 1-2 wt %. An amount of Sn up to 6 wt % is considered to be advantageous with respect to the mechanical properties, but this upper limit may be lowered, for instance if Al and/or Ti are also comprised by the Zr-based alloy.

According to an embodiment of the invention, the amount of Ti=1-20 wt %, 2-20 wt %, 4-20 wt %, 6-20 wt %, 8-20 wt %, 10-20 wt %, 1-18 wt %, 1-16 wt %, 1-14 wt %, 1-12 wt %, or 1-10 wt %. An amount of Ti up to 20 wt % is considered to be advantageous with respect to the mechanical properties, but this upper limit may be lowered, for instance if Al and/or Sn are also comprised by the Zr-based alloy.

According to an embodiment of the invention, the amount of Ti of the Zr-based alloy is enriched with regard to the isotope Ti-50 and/or depleted with regard to the isotope Ti-48. Ti-48 has a relatively high neutron absorption cross section of 7.84 b, whereas Ti-50 has a low neutron absorption cross section of 0.179 b, i.e. in the order of that of Zr. The increased amount of Ti-50 and/or the decreased amount of Ti-48 is thus advantageous in order to minimize the neutronic penalty.

According to an embodiment of the invention, the amount of Al=0.3-2 wt %, 0.5-2 wt %, 0.8-2 wt %, 1.0-2 wt %, 1.3-2 wt %, 1.6-2 wt %, 0.3-1.6 wt %, 0.3-1.3 wt %, 0.3-1.0 wt %, 0.3-0.8 wt %, or 0.3-0.5 wt %. An amount of Al up to 2 wt % is considered to be advantageous with respect to the mechanical properties, but this upper limit may be lowered, for instance if Sn and/or Ti are also comprised by the Zr-based alloy. From Williams report mentioned above one can observe that binary ZrAl alloys have higher yield strength than Zircaloy-2, but lower creep resistance. From this perspective it seems advantageous to combine Al with Sn and/or Ti.

According to an embodiment of the invention, the total amount of Al+Ti+Sn>2.7 wt %, preferably >3.0 wt %, more preferably >3.5 wt %, and most preferably >4.0 wt %.

According to an embodiment of the invention, the total amount of Al+Ti+Sn is equal to or less than 24 wt %.

According to an embodiment of the invention, the amount of O>800 wtppm.

According to an embodiment of the invention, the cladding tube comprises an inner liner provided against the inner surface of the tubular base component. The inner liner may mitigate the effect of the Pellet-Cladding Interaction, PCI. The inner liner may comprise a layer of un- or low-alloyed zirconium which is metallurgically bonded to the Zr-based alloy of the tubular base component of the cladding tube. Such an inner liner may by virtue of its softness and different chemical composition, compared to the tubular base component, inhibit the initiation and propagation of PCI cracks.

Consequently, the present invention, focusing on the mechanical properties of the tubular base component, may be combined with such an inner liner to reach the best combination of the mechanical strength of the tubular base component with the PCI, oxidation and hydriding resistance of the inner liner, along with the wear, corrosion, both oxidation and hydriding, resistance of the coating.

Furthermore, the purpose is achieved by the fuel rod initially defined, which comprises a cladding tube as defined above.

Still further, the purpose is achieved by the fuel assembly initially defined, which comprises a bundle of fuel rods as defined above.

BRIEF DESCRIPTION OF THE DRAWINGS

The present invention is now to be explained more closely through a description of various embodiments and with reference to the drawing attached hereto.

DETAILED DESCRIPTION

Figure 1:
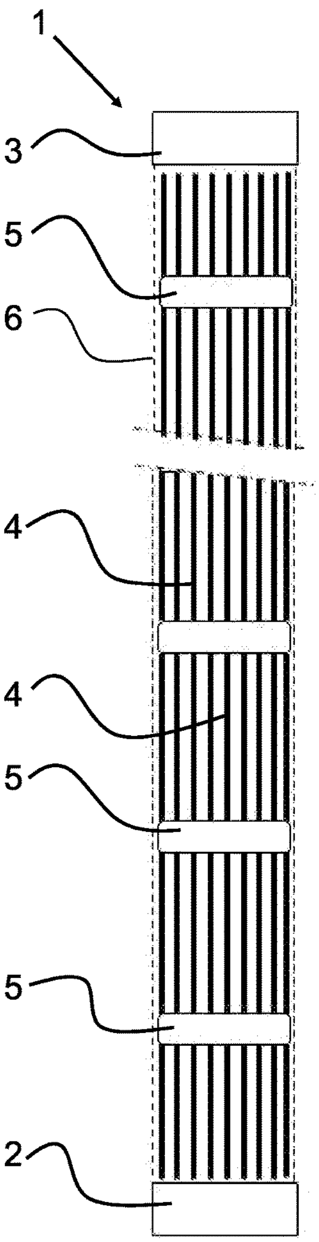
FIG. 1 discloses schematically a longitudinal sectional view of a fuel assembly for a nuclear reactor according to a first embodiment of the invention.

FIG. 1 discloses a fuel assembly 1 configured for being used in a nuclear reactor, especially a Light Water Reactor, LWR, such as a Boiling Water Reactor, BWR, a Pressure Water Reactor, PWR, or a Water-Water Energetic Reactor, VVER.

The fuel assembly 1 comprises a bottom member 2, a top member 3 and a plurality of elongated fuel rods 4 extending between the bottom member 2 and the top member 3. The fuel rods 4 are maintained in their positions by means of a plurality of spacers 5.

Furthermore, the fuel assembly 1 may, for instance when configured for use in a BWR, comprise a flow channel or fuel box indicated by dashed lines 6 and surrounding the fuel rods 4.

Figure 2:
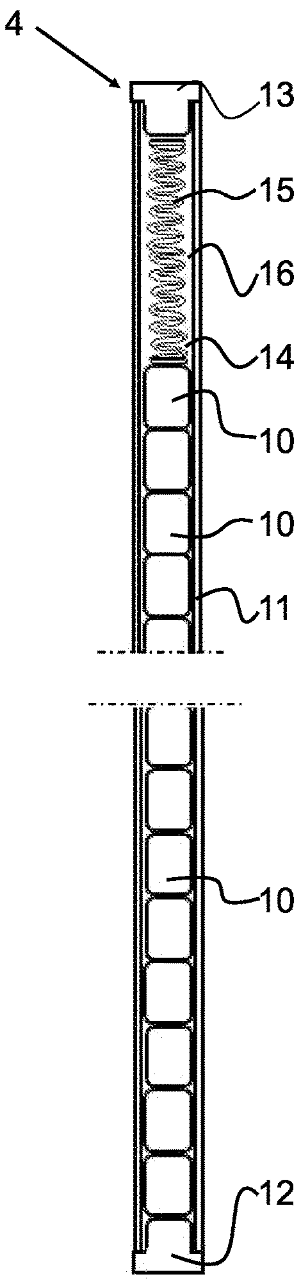
FIG. 2 discloses schematically a longitudinal sectional view of a fuel rod of the fuel assembly in FIG. 1.

FIG. 2 discloses one of the fuel rods 4 of the fuel assembly 1 in FIG. 1. The fuel rod 4 comprises a nuclear fuel, for instance in the form of a plurality of sintered nuclear fuel pellets 10, and a cladding tube 11 enclosing the nuclear fuel, in this case the nuclear fuel pellets 10.

The fuel rod 4 may comprise a bottom plug 12 sealing a lower end of the cladding tube 11, and a top plug 13 sealing an upper end of the cladding tube 11. The nuclear fuel pellets 10 are arranged in a pile in an inner space 14 of the cladding tube 11. The cladding tube 11 encloses the fuel pellets 10 and a gas in the inner space 14.

A spring 15 may be arranged in an upper plenum 16 of the inner space 14 between the pile of nuclear fuel pellets 10 and the top plug 13. The spring 15 compresses the pile of nuclear fuel pellets 10 against the bottom plug 12.

Figure 3:
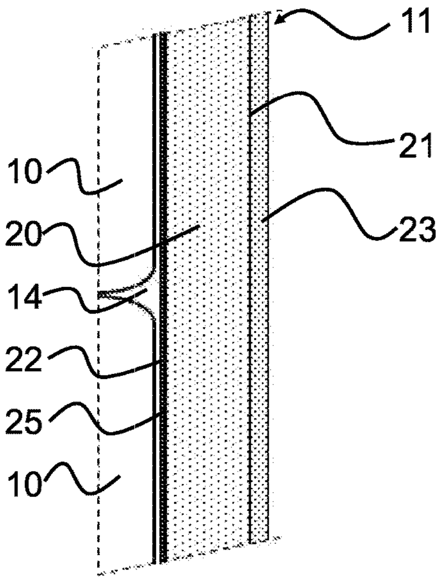
FIG. 3 discloses schematically an enlarged longitudinal sectional view of a part of the fuel rod in FIG. 2 comprising a tubular base component and a coating.

As can be seen in FIG. 3, the cladding tube 11 comprising a tubular base component 20 having an outer surface 21 and an inner surface 22 towards the inner space 14 housing the pile of fuel pellets 10. The tubular base component 20 has a wall thickness extending from the inner surface 22 to the outer surface 21.

The tubular base component 20 is made of a Zr-based alloy to be described more closely below.

The cladding tube 11 also comprises a coating 23 applied onto the outer surface 21 of the tubular base component 20. The coating 23 may enclose the whole outer surface 21 of the tubular base component 20. The coating 23 adjoins the tubular base component 20 and is configured to protect the tubular base component 20 from mechanical wear, oxidation and hydriding.

According to the first embodiment, the coating 23 comprises or consists of one layer 24. The layer 24 may thus form an outer surface layer configured to be in contact with a cooling and moderating medium of the nuclear reactor.

According to the first embodiment, the layer 24 may comprise Cr. The layer 24 may comprise or consist of elemental Cr together with possible other alloying elements.

According to a further embodiment, the layer 24 may, as an alternative or a supplement, comprise at least one of a ceramic oxide, a ceramic carbide, a ceramic nitride and Diamond-Like Carbon (DLC), together with possible other alloying elements.

According to the first embodiment, the coating 23, i.e. the layer 24 may be physically vapor deposited onto the outer surface 21 of the tubular base component 20. Physical vapor deposition, PVD, of the layer 24 may ensure a strong bonding of the coating 23 to the Zr-based alloy of the tubular base component 20.

It should be noted that also other methods of applying the coating 23 may be employed, for instance chemical vapor deposition, electroplating, cold spraying, etc.

The coating 23 may have a thickness of at most 0.1 mm. Furthermore, the coating 23 may have a thickness of at least 0.003 mm, at least 0.005 mm or at least 0.01 mm.

The Zr-based alloy of the tubular base component 20 has the following composition: Zr=balance, Al=0-2 wt %, Ti=0-20 wt %, Sn=0-6 wt %, Fe=0-0.4 wt %, Nb=0-0.4 wt %, O=200-1800 wtppm, C=traces-200 wtppm, Si=traces-200 wtppm, and S=traces-200 wtppm. The total amount of Al+Ti+Sn>2.5 wt % and ≤28 wt %.

Sn, Al and Ti may be included separately or in combination with each other. In other words, the Zr-based alloy may comprise only one of Sn, Al and Ti, two of Sn, Al and Ti, or all three of Sn, Al and Ti.

According to a further embodiment, the total amount of Sn+AI+Ti is larger than 2.7 wt %, preferably larger than 3.0 wt %, more preferably larger than 3.5 wt %, and most preferably larger than 4.0 wt %.

According to a further embodiment, the total amount of Al+Ti+Sn in the Zr-based alloy may be equal to or less than 24 wt %, equal to or less than 20 wt %, equal to or less than 16 wt %, equal to or less than 12 wt %, or equal to or less than 8 wt %.

The amount of Sn in the Zr-based alloy may be 1-6 wt %, 2-6 wt %, 3-6 wt %, 4-6 wt %, 5-6 wt %, 1-5 wt %, 1-4 wt %, 1-3 wt %, or 1-2 wt %.

The neutron absorption cross section of natural Sn is 0.626. Natural Sn contains several isotopes, namely Sn-112, Sn-114, Sn-115, Sn-116, Sn-117, Sn-118, Sn-119, Sn-120, Sn-122 and Sn-124. In order to reduce the neutron absorption cross section, Sn may be enriched with regards to some of the even isotopes, such as Sn-114, Sn-116, Sn-118, Sn-120, Sn-122 and Sn-124, which all have a neutron absorption cross section below 0.626 b.

The amount of Ti in the Zr-based alloy may be 1-20 wt %, 2-20 wt %, 4-20 wt %, 6-20 wt %, 8-20 wt %, 10-20 wt %, 1-18 wt %, 1-16 wt %, 1-14 wt %, 1-12 wt %, or 1-10 wt %.

The neutron absorption cross-section of natural Ti, containing the isotopes Ti-46, Ti-47, Ti-48, Ti-49 and Ti-50, is 6.09 b. Ti-48 has a high neutron absorption cross section of 7.84 b, whereas Ti-50 has a low neutron absorption cross section of 0.179 b. The amount of Ti in the Zr-based alloy may thus be enriched with regard to the isotope Ti-50 and/or depleted with regard to the isotope Ti-48.

The amount of Al in the Zr-based alloy may be 0.3-2 wt %, 0.5-2 wt %, 0.8-2 wt %, 1.0-2 wt %, 1.3-2 wt %, 1.6-2 wt %, 0.3-1.6 wt %, 0.3-1.3 wt %, 0.3-1.0 wt %, 0.3-0.8 wt %, or 0.3-0.5 wt %.

The Zr-based alloy may comprise a higher amount of O, for instance equal to or more than 800 wtppm up to the maximum level of 1800 wtppm.

The cladding tube 11 may also comprises an inner liner 25 provided against the inner surface 22 of the tubular base component 20. The inner liner 25 may be Zr-based and may include the following alloying elements 0.1-0.4 wt % Sn, 0.04-0.07 wt % Fe, 0-0.07 wt % Cr, and <600 wtppm O. In addition, the Zr-based inner liner 25 may include low or insignificant levels of impurities.

The amount of the alloying elements in the inner liner 25 is below the levels of the alloying elements in the Zr-based alloy of the tubular base component 20.

The inner liner 25 may have a thickness that constitutes about 10% of the wall thickness of the tubular base component 20.

Figure 4:
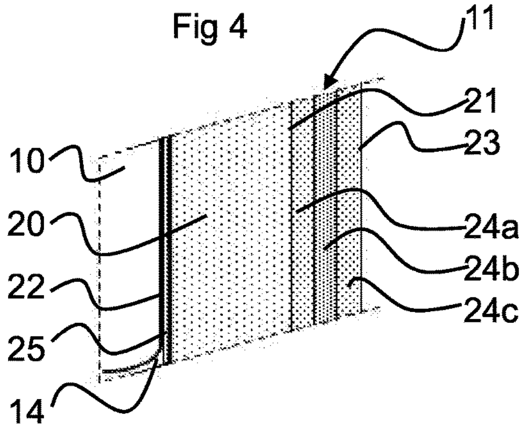
FIG. 4 discloses schematically an enlarged longitudinal sectional view of a part of the fuel rod in FIG. 2 comprising a tubular base component and a coating and according to a second embodiment.

FIG. 4 illustrates a second embodiment that differs from the first embodiment in that the coating 23 is a multilayer coating. In the second embodiment disclosed, the coating 23 comprises three layers 24, wherein the first layer 24*a* encloses and adjoins the outer surface 21 of the tubular base component 20, the second layer 24*b* encloses and adjoins the first layer 24*a*, and the third layer 24*c* encloses and adjoins the second layer 24*b*. The third layer 24*c* forms an outer surface layer configured to be in contact with a cooling and moderating medium of the nuclear reactor.

The first, second and third layers 24*a*-24*c* layers may have different compositions. The thickness of the coating 23 of the second embodiment may be equal to the one of the first embodiment. The first, second and third layers 24 are physically vapor deposited onto the outer surface 21 of the tubular base component 20 and onto each other.

It should be noted that the coating 23 may alternatively comprise two layers or more than three layers, for instance 4, 5, 6, 7 or even more layers.

The invention is not limited to the embodiments disclosed but may be varied and modified within the scope of the following claims.

The invention claimed is:

1. A cladding tube for a fuel rod for a nuclear reactor, the cladding tube comprising:

a tubular base component having an outer surface and an inner surface defining an inner space of the cladding tube housing a pile of fuel pellets, wherein the tubular base component is made of a Zr-based alloy, and a coating applied onto the outer surface of the tubular base component and configured to protect the tubular base component from mechanical wear, oxidation and hydriding, wherein the Zr-based alloy consists of the following composition:

Zr=balance,
Al=0.3-2 wt %,
Ti=1-20 wt %,
Sn=0-6 wt %,
Fe=0-0.4 wt %,
Nb=0-0.4 wt %,
O=200-1800 wtppm,
C=0-200 wtppm,
Si=0-200 wtppm, and
S=0-200 wtppm, wherein 2.5 wt %<Al+Ti+Sn≤28 wt %.

2. The cladding tube according to claim 1, wherein said coating comprises at least one layer comprising at least one of Cr present in a compound or as elemental Cr, a ceramic oxide, a ceramic carbide, a ceramic nitride and Diamond-Like Carbon (DLC).

3. The cladding tube according to claim 1, wherein said coating comprises at least one layer forming an outer surface layer configured to be in contact with a cooling and moderating medium of the nuclear reactor.

4. The cladding tube according to claim 1, wherein the coating is physically vapor deposited onto the outer surface of the tubular base component.

5. The cladding tube according to claim 1, wherein the amount of Sn=1-6 wt %.

6. The cladding tube according to claim 1, wherein the amount of Ti of the Zr-based alloy is enriched with regard to the isotope Ti-50 and/or depleted with regard to the isotope Ti-48.

7. The cladding tube according to claim 1, wherein the total amount of Al+Ti+Sn >2.7 wt % and less than or equal to 28 wt %.

8. The cladding tube according to claim 1, wherein the total amount of Al+Ti+Sn >3.0 wt % and less than or equal to 28 wt %.

9. The cladding tube according to claim 1, wherein the total amount of Al+Ti+Sn >3.5 wt % and less than or equal to 28 wt %.

10. The cladding tube according to claim 1, wherein the total amount of Al+Ti+Sn >4.0 wt % and less than or equal to 28 wt %.

11. The cladding tube according to claim 1, wherein the total amount of Al+Ti+Sn is greater than 2.5 wt % and equal to or less than 24 wt %.

12. The cladding tube according to claim 1, wherein the amount of O>800 wtppm and less than or equal to 1800 wtppm.

13. The cladding tube according to claim 1, wherein the cladding tube comprises an inner liner provided against the inner surface of the tubular base component.

14. A fuel rod comprising a cladding tube according to claim 1.

15. A fuel assembly comprising a bundle of fuel rods according to claim 14.

* * * * *